US012723729B2

(12) United States Patent
Hanafi et al.

(10) Patent No.: US 12,723,729 B2
(45) Date of Patent: Sep. 1, 2026

(54) LIGHTING ARRANGEMENT, VEHICLE LIGHT AND VEHICLE

(71) Applicant: Bayerische Motoren Werke Aktiengesellschaft, Munich (DE)

(72) Inventors: Abdelmalek Hanafi, Munich (DE); Sebastian Morgenstern, Karlsfeld (DE); Reinhard Seifried, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/846,337

(22) PCT Filed: Jun. 20, 2023

(86) PCT No.: PCT/EP2023/066595
§ 371 (c)(1),
(2) Date: Sep. 12, 2024

(87) PCT Pub. No.: WO2023/247512
PCT Pub. Date: Dec. 28, 2023

(65) Prior Publication Data

US 2025/0189096 A1 Jun. 12, 2025

(30) Foreign Application Priority Data

Jun. 23, 2022 (DE) ..................... 10 2022 115 618.4

(51) Int. Cl.
*F21S 43/235* (2018.01)
*B60Q 3/64* (2017.01)
(Continued)

(52) U.S. Cl.
CPC .............. *F21S 43/253* (2024.05); *B60Q 3/64* (2017.02); *F21S 41/25* (2018.01); *F21S 41/285* (2018.01);
(Continued)

(58) Field of Classification Search
CPC ........... B60Q 3/62–66; B60Q 3/74–745; F21S 41/24–285; F21S 43/235–2817; G02B 30/26–29; H04N 13/305–307
See application file for complete search history.

(56) References Cited

U.S. PATENT DOCUMENTS

| | | | | |
|---|---|---|---|---|
| 6,231,201 | B1 | 5/2001 | Rupp | |
| 7,556,412 | B2 * | 7/2009 | Guillermo ................ | B60Q 1/28 362/570 |

(Continued)

FOREIGN PATENT DOCUMENTS

| | | |
|---|---|---|
| DE | 197 46 764 A1 | 5/1999 |
| DE | 20 2016 100 986 U1 | 5/2017 |

(Continued)

OTHER PUBLICATIONS

International Search Report (PCT/ISA/210) issued in PCT Application No. PCT/EP2023/066595 dated Aug. 18, 2023 with English translation (7 pages).

(Continued)

*Primary Examiner* — Jason M Han
(74) *Attorney, Agent, or Firm* — Crowell & Moring LLP

(57) ABSTRACT

A lighting arrangement for a vehicle includes a lenticular grid device having a lenticular grid and an image element arrangement having a plurality of first image elements and a plurality of second image elements; and a lighting device having a flat light guide and at least one optical fiber arranged at least in sections on a lateral edge of the flat light guide. The optical fiber is arranged to emit light coupled into the optical fiber and to couple the light into the planar light guide. The planar light guide is configured to couple out the light coupled into the planar light guide such that the light impinges on the image element arrangement from a side of the lenticular grid device opposite the lenticular grid.

14 Claims, 4 Drawing Sheets

(51) Int. Cl.

| | |
|---|---|
| ***F21S 41/20*** | (2018.01) |
| ***F21S 41/25*** | (2018.01) |
| ***F21S 43/20*** | (2018.01) |
| ***F21S 43/237*** | (2018.01) |
| ***F21S 43/239*** | (2018.01) |
| ***F21S 43/245*** | (2018.01) |

(52) U.S. Cl.
CPC .......... *F21S 43/237* (2018.01); *F21S 43/239* (2018.01); *F21S 43/245* (2018.01); *F21S 43/28131* (2024.05)

(56) References Cited

U.S. PATENT DOCUMENTS

| | | | | |
|---|---|---|---|---|
| 8,033,706 | B1 | 10/2011 | Kelly et al. | |
| 8,059,217 | B2 * | 11/2011 | Brott | H04N 13/32 349/61 |
| 9,927,087 | B1 * | 3/2018 | Greene | F21S 43/255 |
| 2018/0188437 | A1 | 7/2018 | Hagen et al. | |
| 2021/0382321 | A1 | 12/2021 | Khayat et al. | |

FOREIGN PATENT DOCUMENTS

| | | | |
|---|---|---|---|
| DE | 20 2018 106 219 | U1 | 11/2018 |
| EP | 3 324 103 | A1 | 5/2018 |
| EP | 3 324 103 | B1 | 6/2021 |
| FR | 2 948 174 | A1 | 1/2011 |
| KR | 10-2021-0027656 | A | 3/2021 |
| WO | WO 2016/207294 | A1 | 12/2016 |

OTHER PUBLICATIONS

German-language Written Opinion (PCT/ISA/237) issued in PCT Application No. PCT/EP2023/066595 dated Aug. 18, 2023 with English translation (8 pages).

German-language Search Report issued in German Application No. 10 2022 115 618.4 dated Apr. 4, 2023 with partial English translation (12 pages).

* cited by examiner

LIGHTING ARRANGEMENT, VEHICLE LIGHT AND VEHICLE

BACKGROUND AND SUMMARY

The present invention relates to a lighting arrangement for a vehicle, to a vehicle light having the lighting arrangement, and to a vehicle having the lighting arrangement and/or having the vehicle light.

Known vehicles, in particular land vehicles, typically contain front, rear and side lights (generally: vehicle lights). While nearly only safety aspects, in particular better visibility for the driver in the dark and better visibility of the driver's vehicle, were important in the development of the vehicle lights in earlier vehicle models, vehicles of the latest generations are frequently provided with a lighting device which can give the vehicle a characteristic light signature. The lighting device may be designed here not only with light-emitting surfaces, but even with more complex three-dimensional light-emitting bodies (what are known as light sculptures) in order to ensure better visibility and/or recognizability of the vehicle.

Against this background, it is an object of the present invention to provide a lighting arrangement for a vehicle which is comparatively cost-efficient in terms of production, can be easily integrated in the vehicle and whose appearance can vary depending on a viewing axis along which the lighting arrangement is viewed. It is furthermore an object to provide a corresponding vehicle light and a corresponding vehicle.

This object is achieved by a lighting arrangement, a vehicle light, and a vehicle having the features of the claimed invention.

The lighting arrangement is provided for a vehicle (in particular a land vehicle, watercraft and/or aircraft) and comprises a lens grid device having a lens grid and an image element arrangement with a plurality of first image elements and a plurality of second image elements. When viewing the lens grid device along a first viewing axis, a first image, formed by the first image elements, is visible and when viewing the lens grid device along a second viewing axis, which differs from the first viewing axis, a second image, formed by the second image elements (the second image preferably being different from the first image), is visible. Moreover, the lighting arrangement comprises a lighting device having a surface-type light guide and at least one optical fiber, which is arranged at least in sections at a lateral (in particular when viewing along the first and/or second viewing axis) periphery of the surface-type light guide. The optical fiber is arranged to emit light coupled into the optical fiber and to couple it into the surface-type light guide. The surface-type light guide is configured to couple out the light which was coupled into the surface-type light guide in a manner such that it is incident on the image element arrangement from a side of the lens grid device that lies opposite the lens grid.

This makes it possible to represent for the viewer in one and the same lighting arrangement the first image or the second image depending on the selected viewing axis. The lighting arrangement can advantageously be used in various ways and be integrated in particular in relatively thin installation spaces, for example on a vehicle body outer skin or of an interior surface of the vehicle. Accordingly, the proposed lighting arrangement allows the installation space of the vehicle to be used efficiently. Moreover, the lens grid device can be backlit homogeneously so that the first image and/or the second image can be represented precisely.

The lighting arrangement can advantageously nevertheless be produced relatively (cost-) effectively. In particular, a light-emitting matrix (for example an LED matrix with a plurality of LEDs and the associated controller) can be dispensed with. Since the parts list for the production of the lighting arrangement can be reduced, in other words since relatively few component parts need to be installed, the risk of production errors can be reduced. In addition, the lighting arrangement can be designed to be radar-transparent in a relatively simple way. In one preferred refinement, the lighting arrangement can be transmissive for infrared, in particular near-infrared, electromagnetic radiation and for radio waves.

In the context of the present disclosure, the term viewing axis refers to an optical axis along which light from the lens grid device can propagate toward the viewer. To this extent, the first viewing axis can extend through a first eye of a viewer and the second viewing axis through a different, second eye of the viewer, or else through the same eye if it views the lens grid device successively from different viewing angles.

A surface-type light guide in the present case refers to a light guide which extends further in two mutually orthogonal directions (longitudinal direction/length and transverse direction/width) in each case than in a direction perpendicular to the two orthogonal directions mentioned. The surface-type light guide is designed here to guide the light coupled into it two-dimensionally in the longitudinal direction and the transverse direction (in particular using total internal reflection). Surface-type light guides are also referred to as surface light guides. The lateral periphery of the surface-type light guide thus forms (when viewed perpendicular to the longitudinal and transverse directions) the external circumferential surface of the surface-type guide. In contrast to the surface-type light guide, the at least one optical fiber extends (in its unbent state) along a main direction of extent and guides the light coupled into it in this main direction of extent.

In particular when viewed from a small distance, three-dimensional light figures can be visualized using the lighting arrangement in a relatively elegant manner by way of auto-stereoscopic images. Alternatively, the lens grid device can be used in particular for representing changing images (known as flip images) for viewing from a larger distance. In this case, an angle between the first viewing axis and the second viewing axis at an upper surface of the lens grid device which lies opposite the lighting device and faces the viewer can be greater for a specific distance between the viewer and the lens grid device (known as visibility range) than an angle between the viewing axes of the eyes of the viewer for the same, specific distance.

The lens grid device (also known as a lenticular device or a (static or dynamic) lenticular image) contains a plurality of lenses arranged next to one another which form the lens grid. Here, the lenses can be arranged one-dimensionally next to one another in the form of a row of lenses or two-dimensionally in rows and columns. Furthermore, the lenses can be designed as cylindrical lenses (curved in one direction) or spherical lenses (curved in two directions) and have an aspheric cross section in each case. The image elements preferably have a geometry which corresponds to the lenses in a manner such that the image elements extend in each case relative to the respective viewing axis along the focus of the lens. That is to say, if the lenses are designed as cylindrical lenses, the image elements are preferably image strips, which each contain a plurality of pixels. If the lenses, by contrast, are designed as spherical lenses, the image elements can be individual pixels. An offset (known as pitch) between two respectively adjacent lenses preferably substantially corresponds to a period of the first, second and possibly further image elements. That is to say, each of the lenses can be assigned a set of first, second and possibly further image elements. Generally speaking, for displaying n images, each lens can thus be assigned n image elements, which in turn can have partial elements (in particular pixels). The image element arrangement can be printed or lasered onto the lens grid device for example on the back. The offset can be between 2 mm and 30 mm.

The lighting arrangement preferably contains a light-emitting arrangement having at least one light source, wherein the light-emitting arrangement is designed to produce the light that is to be coupled into the at least one optical fiber (i.e., the one optical fiber or the plurality of optical fibers). The respective light source can comprise one or more lasers (in particular diode lasers) and/or one or more light-emitting diodes. The light source is preferably arranged to (axially) couple the light into the at least one optical fiber at a longitudinal end thereof. The longitudinal end can be arranged here remote from the lateral periphery, in particular so as to be hidden when viewed along the first and/or second viewing axis. If a plurality of optical fibers are provided, statements that will be made and have been made regarding the optical fibers can apply accordingly to all optical fibers or to the optical fiber bundle mentioned below.

The optical fiber is preferably designed to emit the light which has been coupled into the optical fiber and propagates along a main axis of extent of the optical fiber, at least partially via a cladding surface of the optical fiber. The optical fiber is thus preferably designed as a side-light fiber. Furthermore, the optical fiber can have one or more cores. If a plurality of optical fibers are provided, the optical fibers can be combined into one or more optical fiber bundle(s). The optical fiber(s) can be in the form of plastics fiber(s) or in the form of quartz fiber(s). Preferably, the optical fiber or the optical fiber bundle is flexible, meaning that it can be advantageously bent in a manner that is permanently non-destructive to a bending radius of at most 15 cm or at most 10 cm or at most 5 cm or at most 2 cm or at most 1 cm or at most 0.6 cm.

If the optical fiber is in the form of a multi-core optical fiber, its cores can be enclosed in a shared cladding. In this way, the optical fiber can be mechanically flexible and in addition be constructed with a relatively large diameter, so that the light emerging from the optical fiber can be incident over a relatively large area and at the same time at a comparatively steep angle on the lateral periphery of the surface-type light guide and is thus efficiently couplable into the latter. The cladding (including the aforementioned cladding surface) of the optical fiber can be produced, for example, from a polyolefin. The cladding can be provided with a device for the predefined out-coupling of the light from the optical fiber. A mirror layer is preferably provided on a surface section of the optical fiber that lies opposite a center of the surface-type light guide in order to redirect the light efficiently into the surface-type light guide.

In order to emit the light from the optical fiber, a difference between the refractive index of the cladding and the refractive index of the core/the cores adjacent to the lateral periphery of the surface-type light guide can be reduced compared with a point of the optical fiber that is remote from the lateral periphery. In particular, the difference between the refractive index of the cladding and the refractive index of the core/the cores can vary along the optical fiber. This difference between the refractive indices in an out-coupling section of the optical fiber in which the light is to be coupled out of the optical fiber can be less than 0.2 or less than 0.1 or less than 0.05 or less than 0.01. This enables a relatively precise coupling of the light out of the optical fiber with little loss. Alternatively, the out-coupling section can instead or additionally have out-coupling structures (such as prisms or light-scattering elements) on the cladding.

In one preferred variant, the at least one optical fiber extends at least in sections, in particular when viewed along the first/second viewing axis, along the lateral periphery of the surface-type light guide (i.e., along the contour of the surface-type light guide). The surface-type light guide can have on a side facing the lens grid device a light exit surface, via which the light emerges from the surface-type light guide. The optical fiber can extend at least in sections parallel to the light exit surface. The light exit surface can here be an interface between the surface-type light guide and a connection section extending from the lighting device to the lens grid device, or the lens grid device. The optical fiber can preferably extend over at least half or at least 70% of the contour or along the entire contour of the surface-type light guide, with the result that the surface-type light guide is advantageously fully lit.

The optical fiber can be connected to the surface-type light guide preferably in a form-fitting or integrally bonded manner. The optical fiber can be in contact here with the surface-type light guide and/or be received in a depression formed in the surface-type light guide. In one preferred refinement, the at least one optical fiber lies, preferably with its cladding surface, at least in sections along the contour of the surface-type light guide against the latter. This makes it possible that a first portion of the light propagates from the optical fiber directly via the interface between the optical fiber and the surface-type light guide into the surface-type light guide. A second portion of the light from the at least one optical fiber can leave the optical fiber, by contrast, next to this interface and, after propagation through a different medium, in particular air from the environment of the surface-type light guide, penetrate into the surface-type light guide so as to be able to propagate there analogously to the first portion of the light by way of total internal reflection.

In the variant in which the optical fiber is received in a depression formed in the surface-type light guide, the depression can extend from the lateral periphery in the direction of the center of the surface-type guide. The depression preferably has the form of a groove having a C-shaped cross section. In a cross-sectional view through the optical fiber, a section of the contour of the optical fiber can correspond here to a section of the contour of the depression. Viewed in this cross-sectional view, preferably at least a quarter or at least half of the optical fiber is received in the depression. This makes it possible to enlarge the aforementioned interface between the optical fiber and the surface-type light guide so as to increase the light-guiding efficiency of the lighting arrangement.

In a further preferred variant, a frame section is provided on a side of the light guide opposite the center of the surface-type light guide. The frame section is preferably in the form of a strip, it can likewise be provided with a depression, which is also designed as a groove having the C-shaped cross section. The depression in the frame section and the depression in the surface-type light guide can together form a receptacle in which the optical fiber is received at least in sections. In the aforementioned cross-sectional view, the optical fiber can rest with its entire contour against an inner wall of the receptacle. Preferably, the frame section can be designed at least in sections to be reflective or light-scattering in order to reduce light losses. In particular, an upper surface delimiting the receptacle can for this purpose be metallized/mirrored.

Furthermore it is conceivable that the surface-type light guide has a first region at the lateral periphery, in which the at least one optical fiber (or the optical fiber bundle) is embedded at least in sections in the surface-type light guide. In the cross-sectional view, the boundary between the surface-type light guide and the optical fiber can thus extend along the entire contour of the optical fiber. In particular, a part of the optical fiber can here be poured in the first region by way of a pouring method. Accordingly, this part of the optical fiber can be connected to the surface-type light guide in an integrally bonded manner in order to reduce transmission losses during the propagation of the light from the optical fiber into the surface-type light guide. The outer circumferential surface of the surface-type light guide (at the lateral periphery) can preferably be metallized/mirrored in the first region. Preferably, a reflection layer is formed on an outer upper surface of the lateral periphery in the first region of the surface-type light guide.

The lighting device, in particular the surface-type light guide, and/or the lens grid device can in each case be produced at least partially by way of a pouring method, in particular by way of injection molding. For example, the surface-type light guide can be produced separately from the optical fiber, and the optical fiber can then be joined to the surface-type light guide. The aforementioned depression in the surface-type light guide can be produced during the pouring method. In the variant of the lighting arrangement in which the optical fiber (at least the out-coupling section) is embedded in the surface-type light guide, the optical fiber can be positioned in an injection mold in a production method step, and the molding compound can then be filled into the cavity of the injection mold so that the optical fiber is already embedded with its out-coupling section in the surface-type light guide when the latter is demolded.

In a further variant, the lateral periphery can be formed in the first region of the surface-type light guide in a preferably convex (outwardly curved) manner. That is to say, the lateral periphery can have in particular a D-shaped cross section in the first region in the cross-sectional view through the at least one optical fiber. The outer circumferential surface of the surface-type light guide in this case serves de facto as a focusing mirror by virtue of the reflection at the media boundary between the surface-type light guide and its environment (air). This reflection can be amplified by the aforementioned reflection layer. Viewed in the cross-sectional view, the center of the at least one optical fiber (or of the optical fiber bundle) preferably lies in the focus of this focusing mirror. The focusing mirror preferably has the cross section of a parabolic mirror or an elliptical mirror.

In order to couple out the light, which was coupled into the surface-type light guide, as described above, the surface-type light guide can have a, preferably reflective and/or light-scattering, out-coupling optical unit. The out-coupling optical unit can be formed on a rear-side upper surface of the surface-type light guide lying opposite the lens grid device or on the light exit surface (top surface or interface) of the surface-type light guide. The surface-type light guide can advantageously in this case be transparent inside. Alternatively, the out-coupling optical unit may be formed in the interior of the surface-type light guide. The out-coupling optical unit preferably comprises light-refractive or light-scattering elements which redirect light beams of the light propagating through the surface-type light guide in a manner such that they no longer meet the total internal reflection criterion of the surface-type light guide. In particular, the out-coupling optical unit can contain prisms, impressions, microstructures with optical units, lacquer or generally surface and/or volume scatterers. Alternatively or in addition, the out-coupling optical unit can contain a reflector or a metallic coating. The term optical unit here refers to an apparatus influencing the light propagation in accordance with its general definition.

The surface-type light guide can be produced from a plastic, in particular polymethyl methacrylate (PMMA) or polycarbonate (PC) or a glass. In order to be able to flexibly and elegantly integrate the lighting arrangement into comparatively thin installation spaces, the lens grid device and the lighting device preferably have a thin design and together have an overall thickness of less than 10 mm or less than 5 mm. A diameter of the at least one optical fiber or of the at least one optical fiber bundle can be at least 0.1 mm, at least 0.2 mm or at least 0.5 mm. The diameter of the at least one optical fiber or of the at least one optical fiber bundle can additionally be at most 2 mm, at most 3 mm or at most 5.2 mm. The diameter of the at least one optical fiber or of the at least one optical fiber bundle is preferably at most as great as a thickness of the surface-type light guide. The thickness of the surface-type light guide can be homogeneous here, and its light exit surface can be planar.

In a further variant, the surface-type light guide has at least one second region, in which the surface-type light guide tapers with increasing distance from the lateral periphery toward a center of the surface-type light guide. This taper can in particular be linear. The light exit surface of the lighting device can extend here substantially parallel to the image element arrangement and the rear-side upper surface of the surface-type light guide lying opposite the lens grid device can extend at an angle to the light exit surface. In this case, the surface-type light guide is thus formed preferably in the shape of a wedge in the second region and has, when viewed in the aforementioned cross-sectional view of the optical fiber, a triangular cross section. The out-coupling optical unit is designed here most preferably to be reflective (with negligible scattering), so that a high light yield can be realized. In order to backlight the image element arrangement even more homogeneously, a light-scattering optical unit (for example diffuser) can be provided between the out-coupling optical unit or the surface-type light guide and the image element arrangement.

The first and/or the second region can in each case extend over part of the entire lateral periphery of the surface-type light guide. Alternatively, it is conceivable that the first or the second region extend in each case over the entire lateral periphery of the surface-type light guide. Viewed in the cross-sectional view through the at least one optical fiber, the surface-type light guide can thus taper from two mutually opposite lateral upper surfaces, preferably symmetrically. With the utmost preference, the surface-type light guide, when viewed in the cross-sectional view, has an axis of symmetry which extends substantially through the center of the surface-type light guide and/or substantially perpendicular to the light exit surface or to the rear-side upper surface of the surface-type light guide opposite the lens grid device.

If a plurality of optical fibers are provided (i.e., if the at least one optical fiber includes at least one first optical fiber and at least one second optical fiber), these optical fibers can be designed to guide light having different light parameters (for example different light colors/light spectra). This light having the different light parameters can be made available by the light-emitting arrangement. In particular, the light-emitting arrangement can be configured to couple light having a first spectrum into the at least one first optical fiber and light having a second spectrum, different from the first spectrum, into the at least one second optical fiber. In this way, different light effects can be produced, which can be used for different purposes. For example, the light having the first spectrum can be emitted here as (yellow) indicator light, and the light having the second spectrum can be emitted as (red) taillight or stoplight.

The vehicle light proposed here is provided with a lighting arrangement which was described previously in detail. The lighting arrangement is preferably arranged in an interior region of the vehicle light. It can be covered with respect to the environment of the vehicle light by way of a cover plate. The vehicle light is preferably in the form of a front light, in particular a headlight, or a taillight. Moreover, it is conceivable to arrange the vehicle light centrally at a front end, preferably below a front flap of the vehicle (in the central region of what is known as the radiator grille). The vehicle light can be used as a decorative element, a covering and/or a decorative trim. Moreover, it is conceivable that the vehicle light is an interior light of the vehicle that is arranged on an interior surface (for example a door, an instrument panel or a center console or a roof liner) of the vehicle and can be viewed by vehicle occupants.

The vehicle proposed here is preferably a motor vehicle (in particular a passenger car, most preferably an electric vehicle) and comprises the vehicle light and/or the lighting arrangement. The vehicle light can be designed such that the lighting arrangement covers a vicinity sensor of the vehicle (in particular a radar sensor or a lidar sensor). The radar sensor can be configured to emit radar waves. The lighting arrangement can thus be arranged on the vehicle in such a way that the radar waves, when they are emitted by the radar sensor, are incident in particular on the rear side of the lighting device opposite the lens grid device. The lighting arrangement can thus be part of a trim or a covering of the transmission and/or receiving unit of the radar system through which the radar waves can propagate, while on the front side light exits the lighting arrangement in the direction of the viewer.

Preferred embodiments of a lighting arrangement for a vehicle, of a vehicle light having the lighting arrangement, and of a vehicle and a production method for the lighting arrangement will now be explained in more detail with reference to the attached schematic drawings (not to scale).

DETAILED DESCRIPTION OF THE DRAWINGS

Figure 1:
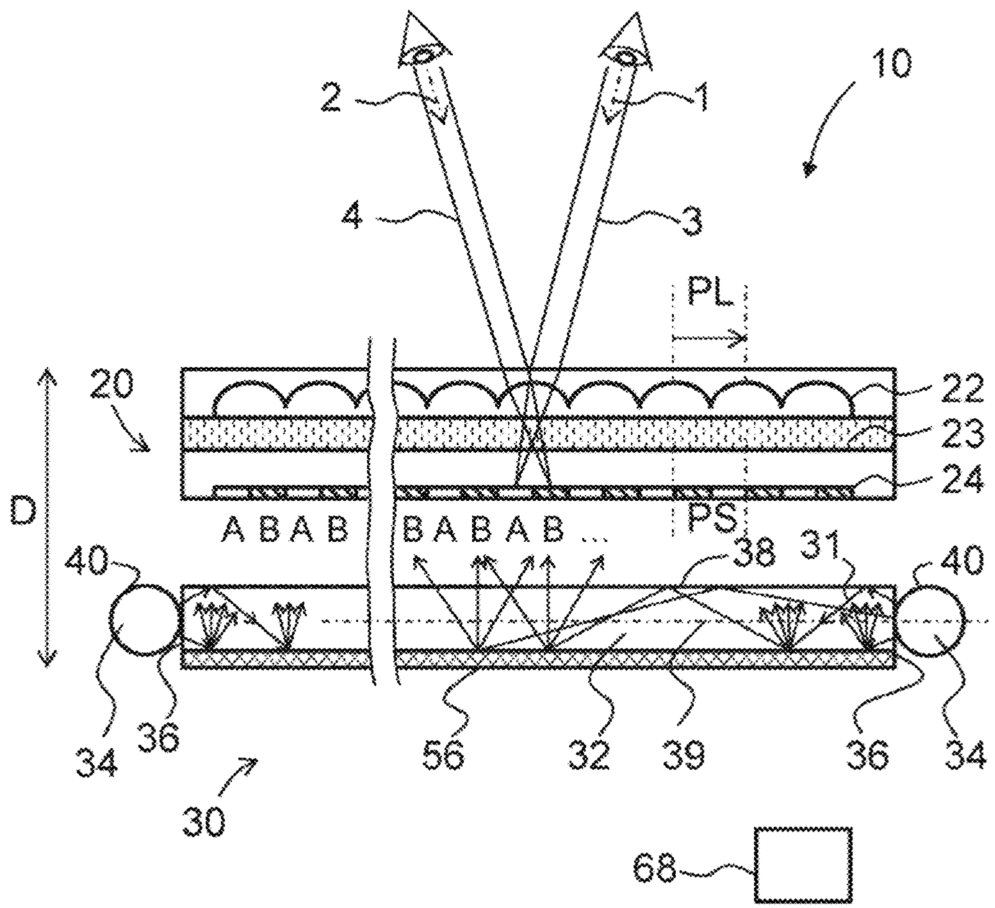
FIG. 1 shows a first variant of a lighting arrangement in a cross-sectional view.
Figure 2:
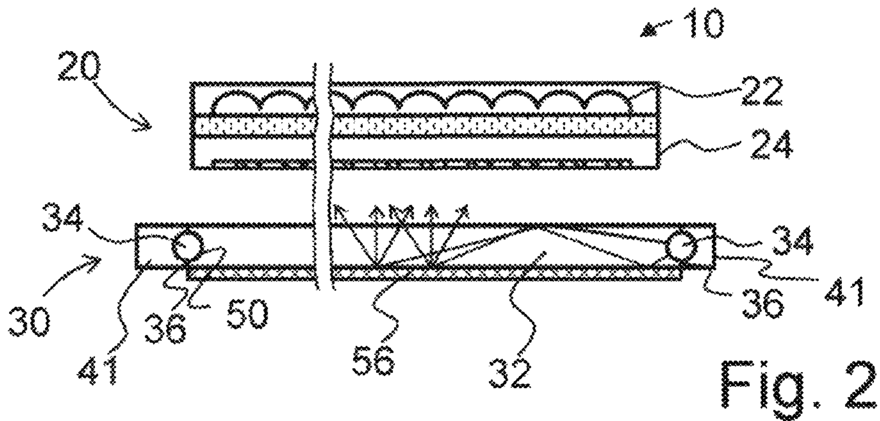
FIG. 2 shows a second variant of a lighting arrangement in a cross-sectional view, in which an optical fiber is arranged at least in sections between a frame section and a surface-type light guide.
Figure 7:
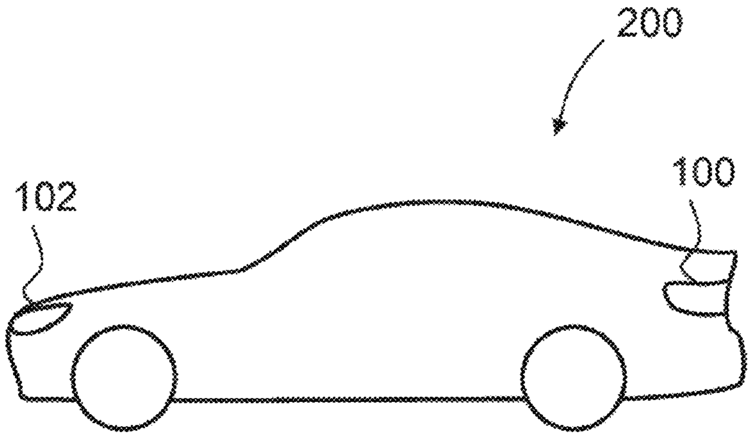
FIG. 7 shows a vehicle having a plurality of lighting arrangements.

FIGS. 1 and 2 show a lighting arrangement 10 for a vehicle 200, which is a passenger car (see FIG. 7). The lighting arrangement 10 can be arranged directly on the vehicle 200, for example on an interior surface of the vehicle 200, or be mounted to the vehicle 200 as part of a vehicle light, for example a headlight.

The lighting arrangement 10 contains a lens grid device 20 and a lighting device 30, wherein the lens grid device 20 is arranged on a front side provided for viewing (viewed side), and the lighting device 30 is arranged therebehind on a rear side opposite the front side. Accordingly, the lens grid device 20 and the lighting device 30 also have a respective front side and rear side.

The lens grid device 20 is in the form of an autostereoscopic image. It is multi- layered and contains a lens grid 22 and an image element arrangement 24 having a plurality of first image elements A and a plurality of second image elements B. The lens grid 22 has a plurality of cylindrical lenses, which extend (with their main direction of extent) parallel to one another and perpendicular to the sheet plane from FIG. 1. The image element arrangement 24 is positioned according to the lens grid 22. That is to say, a respective set of image elements in which in each case a first image element A and a second image element B (and possibly in each case one of the further image elements) is provided can be assigned to a lens. Accordingly, a pitch PL between two mutually adjacent lenses of the lens grid 22 is substantially as great as a pitch PS between the sets of image elements, assigned to the lenses, having the respective first and second image elements A, B (see FIG. 1). The image element arrangement 24 is arranged here in the focal plane of the lenses. The lenses preferably have in each case a width and/or height of at most 2 mm.

When viewing the lens grid device 20 along a first viewing axis 1, a first image, formed by the first image elements A, is thus visible. The first viewing axis 1 can correspond, for example, to the viewing axis of a first eye of a viewer. The light rays 3 from the first image elements A thus propagate through the material of the lens grid device 20, in particular through a carrier layer 23 provided between the lens grid 22 and the image element arrangement 24 and are reflected as they leave the lens grid device 20 through the lens grid 22. If, by contrast, the lens grid device 20 is viewed along a second viewing axis 2, a second image, formed by the second image elements B, is visible. The second viewing axis 2 preferably corresponds to the viewing axis of a second/other eye of the viewer. The light rays 4 from the second image elements B likewise propagate through the material of the lens grid device 20, in particular through the carrier layer 23, and are reflected as they leave the lens grid device 20 through the lens grid 22.

The image element arrangement 24 in this variant is configured in the form of a print and thus invariable over time (static). Alternatively, the image element arrangement 24 can be variable by contrast, in particular in the form of a digital display (for example in the form of an LCD display) and be designed to change the first and/or second image over time. It should be noted that the first and/or the second image are real images (i.e. not virtual images). Further image elements, which are configured like the first and the second image element A, B, per lens can additionally be provided in order to represent further images.

In order to light the lens grid device 20 from its rear side, which is located at the bottom in FIG. 1, the lighting device 30 is provided with a surface-type light guide 32 and an optical fiber 34, which is in the form of a side-light fiber. The surface-type light guide has a main surface 39, which extends through the center of the surface-type light guide, and, preferably extending parallel to the main surface 39, a light exit surface 38 on the front side facing the lens grid device 20. In the variants shown in the figures, the surface-type light guide 32 and the lens grid device 20 are substantially planar, but they can alternatively be designed to be curved (once or multiple times), so that the main surface 39 and the light exit surface 38 can likewise be curved. In addition, an intermediate space is provided in the lighting arrangement 10 from the figures between the lighting device 30 and the lens grid device 20. This intermediate space may be designed to be empty (for example occupied by air) or be formed with material. Alternatively, the light exit surface 38 can directly follow the rear side of the lens grid device 20 or of the image element arrangement 24.

In a top view of the surface-type light guide 32 from the front side (in FIG. 1 from above), the optical fiber 34 extends along the lateral periphery 36 around the, preferably entire, surface-type light guide 32 and thus rests, as shown in the cross-sectional view of FIG. 1, against the outer circumferential surface of the surface-type light guide 32 on opposite sides thereof. In particular, the optical fiber 34 extends parallel to the main plane 39 and to the light exit surface 38 in a manner such that the main plane 39 extends through the optical fiber 34. The optical fiber 34 has a diameter from 0.5 mm to 1.5 mm, the surface-type light guide 32 has a thickness of between 1 mm and 2 mm, and the lens grid device has likewise a thickness of between 1 mm and 2 mm. The overall thickness D of the lens grid device 20 and the lighting device 30 can advantageously be between 2 mm and 4 mm.

Light can be coupled into the optical fiber 34 by way of a light-emitting arrangement 68 having at least one light source. This light can propagate by total internal reflection through the optical fiber 34 and leave the optical fiber 34 next to the lateral periphery 36 via a cladding surface 40 of the optical fiber 34 by virtue of the design of the optical fiber 34 as a side-light fiber (see individual schematic light rays from FIG. 1). The optical fiber 34 is designed here such that it couples the light emerging via the cladding surface into the surface-type light guide 32. For this purpose, a difference in refractive indices between the cladding and the core next to the lateral periphery 36 is reduced and in particular lower than a difference in refractive indices between the cladding and the core of the optical fiber 34 at the location at which the light is coupled into the optical fiber 34.

The light from the optical fiber 34 is, as indicated in FIG. 1, coupled into the surface-type light guide 32 at different locations, preferably along at least half, or at least 75% of the length of the entire outer circumference, of this surface-type light guide, so that the light can propagate through the surface-type light guide 32 under total internal reflection (here at the front side of the surface-type light guide 32).

In order to couple this light out of the surface-type light guide 32, the surface-type light guide 32 has on its rear side a reflective and/or light-scattering out-coupling optical unit 56. In the present case, this out-coupling optical unit 56 contains light-refractive prisms, which redirect light rays in such a way that they can no longer be reflected by total internal reflection at the front-side upper surface of the surface-type light guide 32. Consequently, the light is coupled out such that it is incident on the image element arrangement 24 from a side of the lens grid device 20 that is opposite the lens grid 22 (that is to say, the rear side). Consequently, the lens grid device 20 is backlit homogeneously.

The further propagation of the light takes place initially through the lens grid device 20 from the rear side in the direction of the front side, in particular starting at the image element arrangement 24 via the carrier layer 23 through the lenses. After propagation through the lenses, the light can propagate through a cover plate (not shown) in the direction of the viewer. The cover plate can be, for example, a transparent outer cover plate of the vehicle light mentioned below. While the surface-type light guide 32 (aside from the out-coupling optical unit) is transparent inside and the carrier layer and the outside cover plate are preferably transparent (with color or clear), the light exit surface 38 can be designed to be translucent.

A lighting arrangement 10 shown in FIG. 2 differs from the lighting arrangement 10 from FIG. 1 in that the surface-type light guide 32 has at its outer circumferential surface a depression 50 in which the part of the optical fiber 34 (the out-coupling section) arranged at the lateral periphery 36 is received. Viewed in the cross-sectional view, a frame section 41 having a further depression, in which the aforementioned part is likewise received, is provided radially outside of the optical fiber 34. The surface-type light guide 32 and the frame section 41 thus encompass the aforementioned part (out-coupling section) of the optical fiber 34. The frame section 41 can be mirror-coated on its side which is radially outside relative to the surface-type light guide 32 in order to increase the light yield. The frame section 41 extends, as indicated in FIG. 2, around the lateral periphery 36. Moreover, the lighting arrangement 10 from FIG. 2 has all the features of the lighting arrangement 10 from FIG. 1.

Figure 3:
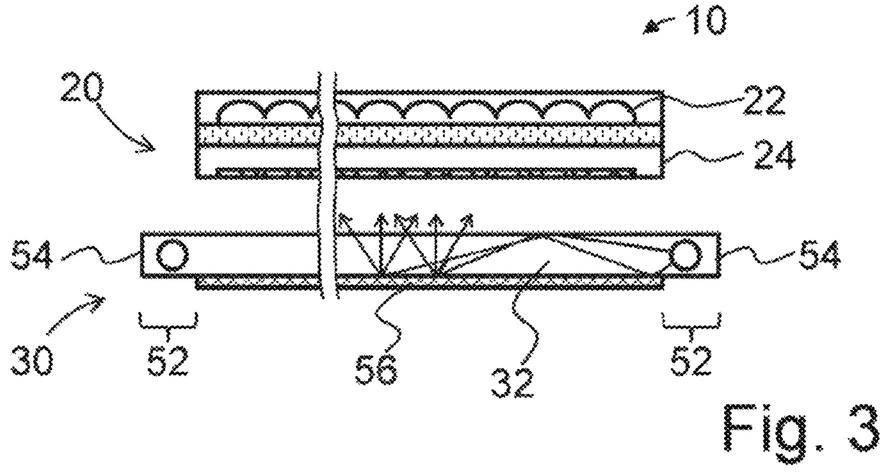
FIG. 3 shows a third variant of a lighting arrangement in a cross-sectional view, in which an optical fiber is embedded at least in sections in a surface-type light guide.

A lighting arrangement 10 shown in FIG. 3 differs from the lighting arrangement 10 from FIG. 2 in that the frame section 41 is integrated de facto into the surface-type light guide 32. That is to say, the surface-type light guide 32 has a first region 52 at the lateral periphery 36, in which the portion (out-coupling section) of the optical fiber 34 that is arranged at the lateral periphery 36 is embedded in the surface-type light guide 32. The out-coupling optical unit 56 may preferably not be formed in this first region 52. In all the variants shown here, the out-coupling optical unit 56 in the top view can be designed in particular substantially (with area deviations of less than 2%) to be congruent with the image element arrangement 24. Moreover, the lighting device 10 from FIG. 2 has all the features of the lighting arrangement 10 from FIG. 2.

Figure 4:
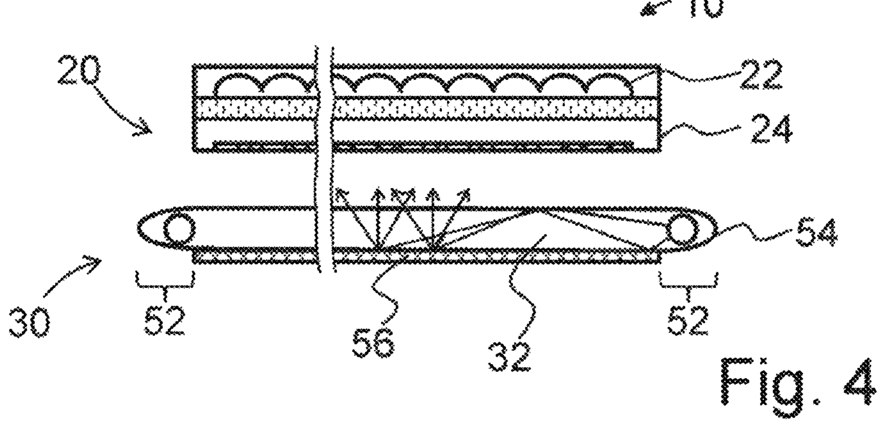
FIG. 4 shows a fourth variant of a lighting arrangement in a cross-sectional view, in which a lateral periphery is curved.

A further lighting arrangement 10 is shown in FIG. 4. It differs from the lighting arrangement 10 from FIG. 3 in that the lateral periphery 36 in the first region 52 of the surface-type light guide 32 is designed to be convex (here: curved so as to bulge radially outwardly). In the cross-sectional view, the first region 52 is practically designed as a parabolic mirror in order to guide more light from the optical fiber 34 in the direction of the center of the surface-type light guide. Here, a reflection layer which is formed on the outer upper surface 54 of the lateral periphery 36 in the first region 52 of the surface-type light guide 32 is advantageous. Moreover, the lighting arrangement 10 from FIG. 4 has all the features of the lighting arrangement 10 from FIG. 3.

Figure 5:
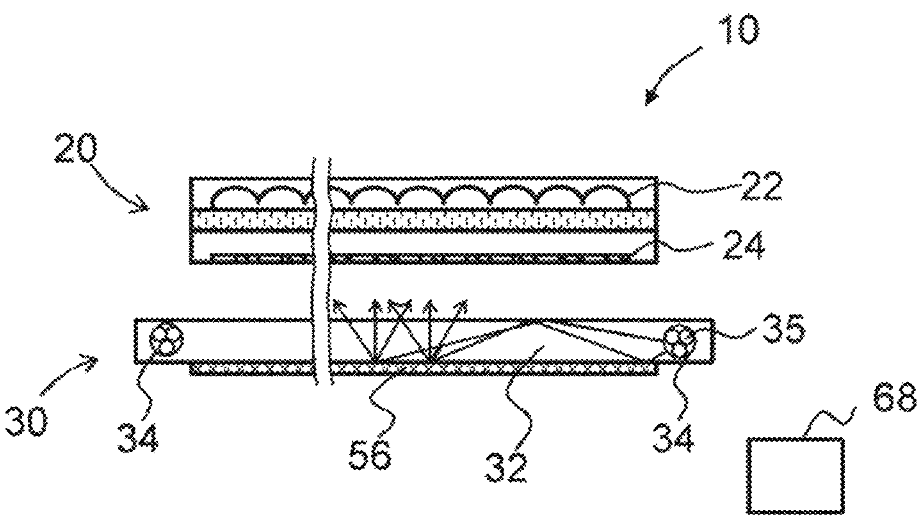
FIG. 5 shows a fifth variant of a lighting arrangement in a cross-sectional view, in which a plurality of optical fibers are embedded as an optical fiber bundle in the surface-type light guide.

In a lighting arrangement 10 from FIG. 5, the optical fiber 34 is, different from the lighting arrangement from FIG. 3, in the form of a multicore optical fiber, so that light of different types can be guided through each of its cores 35 (of which only one is provided with a reference sign in FIG. 5 for the sake of clarity). The light guided through the different cores can differ in terms of at least one light parameter, for example the light spectrum, a time period in which the respective light is guided, or a light intensity.

In a modification which is not shown separately, the multicore optical fiber is replaced by an optical fiber bundle having a plurality of optical fibers. In this modification, there are thus not only a plurality of cores but also a plurality of optical fiber claddings. Statements made above for the cores 35 can here apply accordingly to the optical fibers. Moreover, the lighting arrangement 10 from FIG. 5, including the aforementioned modification, has all the features of the lighting arrangement 10 from FIG. 3.

Figure 6:
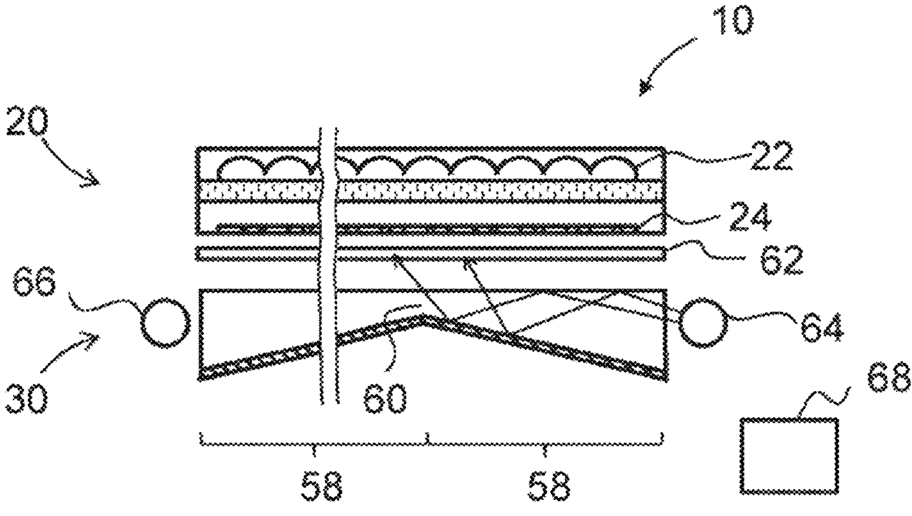
FIG. 6 shows a sixth variant of a lighting arrangement in a cross-sectional view, in which the surface-type light guide is designed in sections in the shape of a wedge.

A yet further lighting arrangement 10 according to FIG. 6 differs from the lighting arrangement 10 from FIG. 1 in that the surface-type light guide 32 has one or more wedge-shaped sections, which, starting from the optical fiber 34, taper in the direction of the center of the surface-type light guide 32. Preferably, the light exit surface 38 is here also planar in this case. By contrast, the rear-side upper surface of the surface-type light guide 32 can extend at an angle to the light exit surface 38. In the present variant, the surface-type light guide 32 has in particular a second region 58, which extends along the lateral periphery 36/the outer circumferential surface around the surface-type light guide. In the second region 58, the surface-type light guide 32 tapers with increasing distance from the lateral periphery 36 in the direction of a center 60 of the surface-type light guide 32. The out-coupling optical unit 56 in this variant is preferably non-scattering.

In this way, the transmission efficiency of the light between the light source and the light exit surface 38 can be increased further. Advantageously, the light exiting through the light exit surface 38 can then be homogenized further by way of a light-scattering optical unit 62 (in particular a diffuser), which is positioned between the surface-type light guide 32 and the image element arrangement 24.

Similar to the variant from FIG. 5, this lighting arrangement has a plurality of optical fibers, in particular at least one first optical fiber 64 and at least one second optical fiber 66. The light-emitting arrangement 68 is configured here to couple light of a first color (i.e. a first spectrum) into the at least one first optical fiber 64 and to couple light of a second color (a second spectrum), which differs from the first color, into the at least one second optical fiber 66. Moreover, the lighting arrangement 10 from FIG. 6 has all the features of the lighting arrangement 10 from FIG. 1.

Provision is made for further modifications that these features by which the lighting arrangement 10 from FIG. 6 differs from the lighting arrangement 10 from FIG. 1 are realized in the lighting arrangements 10 from any of FIGS. 2 to 5.

In the vehicle 200 shown in FIG. 7, one or more lighting arrangements 10 from any of FIGS. 1 to 6 are formed in vehicle lights, which are a front light 102 in the form of a headlight, and a taillight 100. The lighting arrangements 10 are located here preferably in each case in a light chamber of the respective vehicle light.

Figure 8:
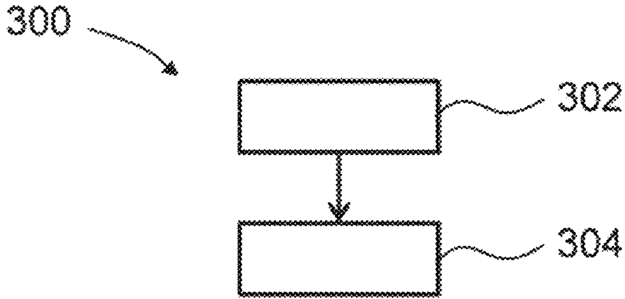
FIG. 8 shows a production method for the lighting arrangement from FIG. 1.

The lighting arrangement 10 can be produced by way of a production method 300, in particular by way\ of injection molding. In a modification of this production method shown in FIG. 8, the part of the at least one optical fiber 34 (alternatively 64, 66) that is to be embedded in the surface-type light guide 32 is introduced into an injection mold in a first step 302. In step 304, the injection mold can then be filled with the molding compound, so that the aforementioned part of the at least one optical fiber 34 has been embedded at the time when demolding takes place. In this way, the lighting arrangement 10 not only provides outstanding optical properties, but it can also be produced efficiently, in particular cost-effectively.

The terms "comprising," "having," "with" and similar terms used in this disclosure should not be understood to be conclusive. In particular, the term "comprising a" in this context means "comprising at least one," i.e., "comprising a" does not exclude the presence of further corresponding elements. At least one in the present case means one or more. At least in sections should be understood to mean in sections or completely.

The invention claimed is:

1. A lighting arrangement for a vehicle, the lighting arrangement comprising:

a lens grid device having a lens grid and an image element arrangement with a plurality of first image elements and a plurality of second image elements, wherein, when viewing the lens grid device along a first viewing axis, a first image formed by the first image elements is visible and, when viewing the lens grid device along a second viewing axis, which differs from the first viewing axis, a second image formed by the second image elements is visible, and a lighting device having a surface-type light guide and at least one optical fiber, which is arranged at least in sections at a lateral periphery of the surface-type light guide, wherein the surface-type light guide has a different cross-sectional geometry from the at least one optical fiber in a plane perpendicular to a long axis of the at least one optical fiber, wherein the at least one optical fiber is arranged to emit light coupled into the at least one optical fiber and to couple the light into the surface-type light guide, and wherein the surface-type light guide is configured to couple out the light in a manner such that the light is incident on the image element arrangement from a side of the lens grid device which lies opposite the lens grid.

2. The lighting arrangement according to claim 1, wherein the at least one optical fiber extends at least in sections along the lateral periphery of the surface-type light guide, and/or wherein the surface-type light guide has on a side facing the lens grid device a light exit surface, and the at least one optical fiber extends at least in sections parallel to the light exit surface.

3. The lighting arrangement according to claim 1, wherein the lens grid device and the lighting device together have an overall thickness of less than 10 mm.

4. The lighting arrangement according to claim 1, wherein the lens grid device and the lighting device together have an overall thickness of less than 5 mm.

5. The lighting arrangement according to claim 1, wherein the at least one optical fiber is configured to emit the light via a cladding surface of the at least one optical fiber, wherein the at least one optical fiber is in contact with the surface-type light guide and/or is received in a depression formed in the surface-type light guide.

6. The lighting arrangement according to claim 1, wherein the surface-type light guide has a first region at the lateral periphery, in which the at least one optical fiber is embedded at least in sections in the surface-type light guide.

7. The lighting arrangement according to claim 6, wherein the lateral periphery in the first region of the surface-type light guide has a convex design, and/or wherein a reflection layer is formed on an outer upper surface of the lateral periphery in the first region of the surface-type light guide.

8. The lighting arrangement according to claim 1, wherein the surface-type light guide has, on a side opposite the lens grid device, an out-coupling optical unit.

9. The lighting arrangement according to claim 8, wherein the out-coupling unit is reflective and/or light-scattering.

10. The lighting arrangement according to claim 1, wherein the surface-type light guide has at least one second region, in which the surface-type light guide tapers with increasing distance from the lateral periphery in a direction of a center of the surface-type light guide, and/or wherein a light-scattering optical unit is provided between the surface-type light guide and the image element arrangement.

11. The lighting arrangement according to claim 1, wherein the at least one optical fiber comprises at least one first optical fiber and at least one second optical fiber, and wherein the lighting arrangement further comprises a light-emitting arrangement, which is configured to couple light of a first spectrum into the at least one first optical fiber and to couple light of a second spectrum, different from the first spectrum, into the at least one second optical fiber.

12. A vehicle light comprising the lighting arrangement according to claim 1.

13. A vehicle light comprising the lighting arrangement according to claim 12, wherein the vehicle light is a front light, a headlight or a taillight.

14. A vehicle comprising the lighting arrangement according to claim 1.

* * * * *